Sept. 1, 1964 F. W. BROOKE 3,147,107
IMMERSION MELTING
Filed July 13, 1961 4 Sheets-Sheet 1

INVENTOR.
Frank W. Brooke
BY Green, McCallister & Miller
HIS ATTORNEYS

INVENTOR.
Frank W. Brooke

Sept. 1, 1964  F. W. BROOKE  3,147,107
IMMERSION MELTING

Filed July 13, 1961  4 Sheets-Sheet 3

INVENTOR.
Frank W. Brooke
BY
HIS ATTORNEYS

Sept. 1, 1964 F. W. BROOKE 3,147,107
IMMERSION MELTING
Filed July 13, 1961 4 Sheets-Sheet 4

INVENTOR.
Frank W. Brooke
BY Green, McCallister & Miller
HIS ATTORNEYS

United States Patent Office 3,147,107
Patented Sept. 1, 1964

3,147,107
IMMERSION MELTING
Frank W. Brooke, King Edward Apts., Pittsburgh, Pa.
Filed July 13, 1961, Ser. No. 123,687
25 Claims. (Cl. 75—38)

This invention pertains to the refining of metals and particularly, to immersion melting of metals in a melting furnace.

The invention makes use of a so-called molecular phenomenon in the melting of metals and particularly, in the melting and refining of ferrous metals and their alloys, of nickel, titanium, zirconium, molybdenum, tungsten, beryllium, boron compounds and hydrides and other high temperature metals and their alloys, and also of copper, zinc and other low temperature metals and alloys.

An object of the invention has been to devise new and improved melting procedure and apparatus for carrying it out;

Another object has been to extend the field of utilization of raw materials used in the making of metals and in a simple manner to produce an improved product;

A further object of my invention has been to make possible the direct utilization of pre-reduced ore, such as in the form of compacts, to meet the ore requirements of a melting furnace, and if desired, to completely supplant the scrap requirements of a furnace, such as an electric furnace.

A still further object of my invention has been to make possible a more direct utilization of ore such as iron ore in forming ingots and castings;

These and other objects of my invention will appear to those skilled in the art from the illustrated embodiments and the claims.

In the drawings,

In FIGURES 4 and 5, the views are transverse sections through a melting furnace;

FIGURES 12 and 13 are somewhat diagrammatic end sections in elevation through furnace melting baths; FIGURE 12 shows a ferrous metal bath having a slag blanket and the problem involved when a charge of titanium metal is introduced through the slag blanket, while FIGURE 13 illustrates a titanium or other metal charge introduced in accordance with my invention and its melting relationship with respect to the molten metal pool of the furnace.

In accordance with what I believe to be the most important phase of my invention, I utilize hot pre-reduced metal ore, while retaining a maximum amount of the heat of the reduction process, by introducing the ore after any desired pelletizing or compacting, directly into an inner or immersion container within which it is consolidated and substantially enclosed and within which it may be further conditioned, and if desired, subjected to heat-conditioning while in position within the outer container by means similar to that disclosed in my Patent No. 2,804,295 for heating-up a scrap metal charge. The ore, as thus compacted within its container which is of a material that is desirable in the furnace melt, such as steel, is then directly immersion-introduced (while retaining substantially its full reduction-imparted heat) into the molten metal bath of a melting and refining furnace. The charge is thus introduced below the surface of the bath and particularly, below the slag blanket. In this way, the metal material being introduced is protected from direct contact with and contamination by the slag blanket and may be introduced into the hottest portion of the melt to facilitate its melting and molecular diffusion.

In accordance with this procedure, initial heat of the metal being charged is substantially retained, a maximum effectiveness of melting action is accomplished, and the refining of the charge is effected from the surface of the molten bath with respect to the slag. Easily oxidized and contaminated metals, such as zirconium, titanium, columbium, etc. thus become molecularly diffused within the melt, without being subjected to adverse action from the standpoint of the slag blanket; gaseous impurities are easily levitated off.

Figure 6:
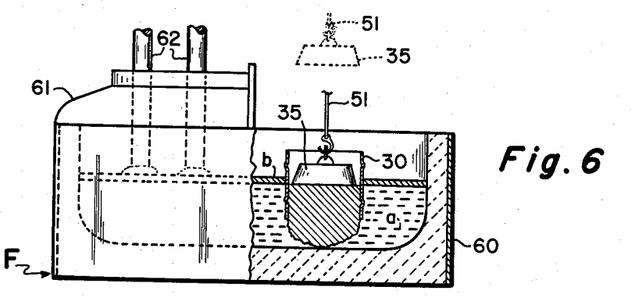
FIGURES 6 and 7 are somewhat diagrammatic side views, partially in section on the scale of FIGURES 2 to 5, inclusive, particularly illustrating immersion introduction of a metal charge into the molten bath of an electric furnace having two sets of electrodes, with each set being movable into and out of an operating position with a section or part of the roof of the furnace, independently of the other set.
Figure 7:
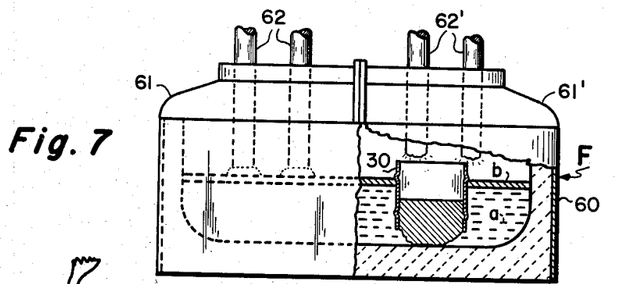

Also, in accordance with my invention, when employing an electric furnace, such as illustrated in FIGURES 6 and 7, one part or a half of a furnace may be melting and refining its material while the other half is being charged. By vibrating and compacting the charge before its introduction into the furnace, maximum efficiency is obtained from the standpoint of a concentration of the charge for its displacing-immersion introduction into a melt; also, the charge may be substantially equalized in its temperature and entrapped air substantially eliminated.

Once the charge as carried by its container is within the furnace melt, the molten metal of the bath then melts the relatively thin wall container, incorporating it and then proceeds to directly melt the charge, with minimized power requirements, due to the utilization or retention of the heat of the material from its prior processing. Further, in employing my invention, it is not necessary to proceed through a commercial type of briquette-processing of directly reduced ore which may contain gangue, and which processing involves a separating-out of the gangue and requires cooling, solidification, drying, magnetic separating and a complexity of equipment for this purpose. By making possible the direct utilization of pre-reduced ore material as it leaves a reducing kiln at an elevated temperature, such ore material may be directly utilized in a furnace such as an electric furnace.

Although, as pointed out above, the procedure of my invention has a wide field of application in the processing of various types of metals, it has particular value in connection with the making of steel and its alloys. Thus, in order to show the impact of the invention in the art as well as to further illustrate it and its principles, I will particularly describe its application to the making of steel.

So-called electrical steel has, during the last fifty years, risen from a small industry to a production of ten to eleven million tons per year and second only to open hearth and oxygen converter steel in the total production of this country. However, after World War II, it has received a serious setback due to the scarcity and price of good steel scrap (its basic charge), the use of oxygen which saves about half the time for producing open hearth steel, and the development of oxygen-blow converters. Because of the expense involved, the use of electric furnaces in making steel has been substantially confined to higher alloy steels which will support a higher sales price.

The tendency in recent years has been to improve the quality of scrap as charged by, for example, pre-processing it by apparatus, such as disclosed in my Patent No. 2,804,295, among other things, in order to minimize tramp elements, such as arsenic, sulphur, and the embrittling moisture. Also, attempts have been made to minimize the percentage of scrap metal required, such as by processing reduced ore to remove its gangue (as by briquette-processing, mentioned above). However, even using briquettes thus produced, the maximum percentage that may be used as a substitute for scrap is in the neighborhood of 60% with an average or optimum of about 40%. The use of conventional methods, such as those mentioned above, to minimize scrap requirements or to improve the quality of scrap for charging purposes, entails increased costs, and the briquette-processing requires expensive equipment and takes up considerable plant space. Further, conventional methods require what may be termed an individualized charging of an electric furnace and necessitate an appreciable cooling down of its molten metal bath in effecting the charging operation.

By way of example, using conventional charging of an electric furnace that employs air-arc melting, to bring it up to a pouring temperature for molten steel of about 2950° F. will require a consumption of an average of about 530 kilowatt hours per ton. However, by employing the principles of my invention, I avoid heat loss from charging material leaving a rotary kiln of about 200 kilowatt hours per ton. As a result, I save about 330 kilowatt hours per ton; based upon a range of power cost of nine to eighteen mils, I have been able to save about $1.80 to $3.60 per ton. In addition, by lowering the consumption of graphite electrodes, I have been able to additionally save about $1.00 per ton. These savings are typical of what I have been able to accomplish by being able to charge a furnace while maintaining its molten metal bath or pool at substantially its pouring temperature, as distinguished from a conventional lowering of the molten metal pool or bath temperature from about 2950° F. to about 1300° to 1400° F.

Further, in accordance with my invention, I have not only been able to totally eliminate metal scrap requirements of an electric furnace, but have been able to, for the first time, make direct utilization of reduced ore as it comes from a rotary kiln and with a minimized loss of its temperature before it is introduced into the furnace. In addition, I have been able to carry out a so-called "flywheel" or continuous utilization of charging material, as made possible by the employment of so-called equalization or holding apparatus and/or in combination with one and preferably a group of furnaces.

Heretofore, further processing (involving cooling down of the material) has been required in utilizing reduced iron in order to separate the metal content from the gangue and other impurities. In this connection, the reduced ore material may comprise about 75% of iron, for example, $Fe_2O_3$ and $Fe_3O_4$, with an average specific heat of .15 as tightly agglomerated or mixed with 25% gangue having a specific heat of .25. This ore, as it leaves a rotary kiln has a heat constant representing about 450,000 B.t.u.'s per ton, and requiring about 200 kilowatt hours to bring it (after cooling) back up to its kiln temperature of about 1900° F. It is this heat that is saved in accordance with a phase of my invention.

By plunging a charge of crude reduced ore directly into a molten metal bath of the furnace that is maintained about 200° above the melting point of the metal, I accomplish a rapid and automatic separation of the iron from the gangue which corresponds to plunging a mass of sugar and sand into boiling water. The result is that particles of iron with their extremely high ratio of $S/M$ (surface over mass) will dissolve in the molten metal bath in a matter of seconds. It will be noted that the reduced iron may be present as sponge, in flake sizes, and down to microscopic particles. In this connection, the gangue has a specific gravity in the neighborhood of about 2, as compared to the specific gravity of molten steel of about 7.5 and, as a result, it will rise rapidly and enter the slag which is always present. As this slag forms, it may be continuously flowed out through slag spouts, one for each melting zone of the furnace.

Equalizers or holding assemblies are employed to not only enable a so-called flywheel type of operation, but to also make possible consolidating or compacting the ore charge prior to its introduction into a furnace. Compaction is desirable in order to minimize the time element in introducing a maximum amount of charge, to facilitate the displacement of the molten metal in the furnace, and to maintain the charge in a submerged relation within the molten metal in such a manner that it will molecularly diffuse therethrough, melt and alloy with and build up the molten charge.

In practicing my invention, I initially provide or maintain a molten metal charge within the furnace, as by conventional methods, to which compact reduced ore charges are immersion-added. The pouring may be effected to pour only the added quantity of metal and to retain a residual quantity for carrying out the desired type of charging operation. When a relatively thin-walled container containing the compact charge is, in accordance with my invention, introduced into and submerged within the molten metal, I make use of a weighted top part which, in itself, may be of heavy cast metal, such as steel, and that will not damage the melt if it is accidentally melted. After the bottom of the container has been melted away and the melting of the sides is being effected, the weighted top or lid may then be withdrawn and can be used again for another charge. That is, the charge will stay in position in its molten metal displacing position, once the container walls begin to disintegrate, as when the bottom portion has melted away.

In my type of melting operation, the main melting is effected within the molten metal rather than in the slag blanket. In a conventional melting operation, small metal particles come into and stay in intimate contact with the slag and, in fact lose their individual $S/M$ value; they become lost and contaminated in the slag and may form compounds therewith. This is also true for large size pieces of highly refractory metals, such as zirconium, titanium, beryllium, etc. In other words, the loss factor is too great to warrant the direct use of reduced ore in employing present procedures.

In practicing my invention, employing equalizing means which will be hereinafter described in detail, I find that a slight loss of temperature of the reduced ore from about 1900° to 1800° F. may be involved. As a result, I can introduce the ore and effect its melting at a great saving in furnace maintenance as well as in electric power and melting time. Assuming that the ore is charged at a temperature of about 1800° F., the rate of heat transfer is in direct proportion of 2300° (an average maximum slag temperature) less 1800° to 2950° F. (steel pouring temperature) less 1800° F. or 500 to 1150. This gives a rate that is approximately two times as fast as a conventional procedure. This, of course, is in addition to the improved melting action that is accomplished and which I have found is due to a direct molecular action between the metal of the molten bath and the immersed charged metal.

Figure 12:
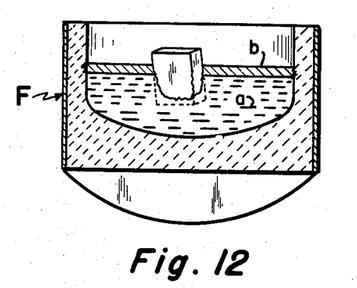

The importance of my invention may be further illustrated from the standpoint of the production of high titanium steel to meet rigid government specifications. Titanium which has a density of about 4.5 as compared to 7.5 for iron, a melting temperature of 3270° F. as compared to 2795° F. for iron, and has a specific heat of .142 as compared to .107 for iron, can be melted in a furnace which has a bath pouring temperatutre of about 2950° F. The iron titanium eutectic ($Fe_3Ti$) has a lower melting temperature of 2358° F. The highly refractory nature of titanium and the differences in its density and melting point from iron, make it difficult to melt the titanium and pass it through the molten slag without high loss of it, contamination of the slag at a critical period of the refining operation, and the resultant erosion of the furnace walls by the contaminated slag. As shown in FIGURE 12 of the drawings, a titanium charge introduced in a conventional manner will tend to float (like an iceberg) and will melt very slowly. By introducing titanium or other refractory metals or iron eutectics in accordance with my procedure, I avoid all these difficulties and produce an improved product. The refractory content of the charge becomes melted and diffused within the molten bath and can only be subjected to slag action as a diffused part of the molten bath and at its surface, see FIGURE 13. In FIGURES 6 and 7, $a$ represents a bath of molten iron and $b$ represents a molten slag blanket.

Figures 1, 2:
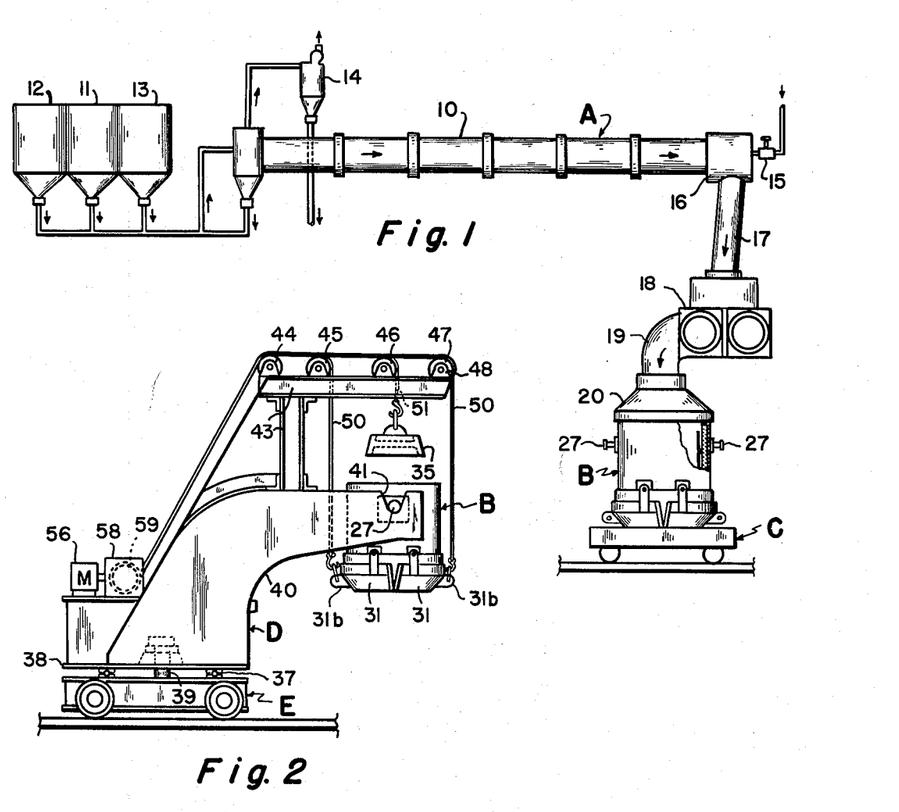
FIGURE 1 is a somewhat diagrammatic view in elevation of a layout that may be employed in directly reducing ore and utilizing it in accordance with my invention.
FIGURE 2 is a side view in elevation and FIGURE 3 is a top plan view of a traveling device or apparatus for directly handling reduced ore as it is supplied to a container or bucket assembly, such as disclosed in FIGURE 1.

In FIGURE 1, I have illustrated a plant layout or apparatus for reducing metal ore in a continuous manner, for compacting the reduced ore into somewhat small masses or lumps, and introducing it into a holding, equalizing, consolidating or unit-charge-compacting, and charging container unit assembly. This apparatus includes an ore-conditioning unit A having a rotary kiln 10 of conventional construction which may be continuously supplied with fresh ore from a hopper 11, with coke fuel from a hopper 12, and with limestone or conditioning material from a hopper 13. Dust in the material may be removed adjacent the inlet end of the kiln 10 by a dust collector 14; the lighter portions may be discharged into a stack and the heavier portions discharged downwardly into a pit. A fuel, such as natural gas may be introduced through a valve 15 into the kiln to maintain it at a proper ore-reducing temperature at which the coke is burned and the limestone and ore are roasted, as they are continuously moved forwardly therealong towards a discharge header 16 at the outlet end of the kiln 10.

The hot reduced ore and gangue thus produced is shown fed by a conduit 17 into a compacting or pelletizing type of machine or apparatus 18. This apparatus may also be of a conventional construction, such as illustrated by FIGURE 8 of Preprint VI–26, published by Interscience Publishers, Inc. of New York, entitled "Hot Briquetting of Partially Reduced Iron Oxide Ores and Dusts" by J. E. Moore and D. H. Marlin of Dravo Corporation, Pittsburgh, Pennsylvania, and copyrighted 1961 by the American Institute of Mining, Metallurgical and Petroleum Engineers, Inc. From the apparatus or machine 18, the still hot metal ore and gangue are shown conducted downwardly through a conduit 19 and a hood 20 into a container assembly B which serves a a holding, equalizing and conditioning unit for the metal charge. The container unit B is shown positioned on a wheeled truck or cart C for movement along a track on the plant floor. Any suitable number of the units B and C may be provided to successively collect the hot reduced ore as it issues continuously from the unit A. The compacting or pelletizing machine unit 18 may, if desired, be eliminated and the hot reduced material fed directly into the unit B.

Figure 8:
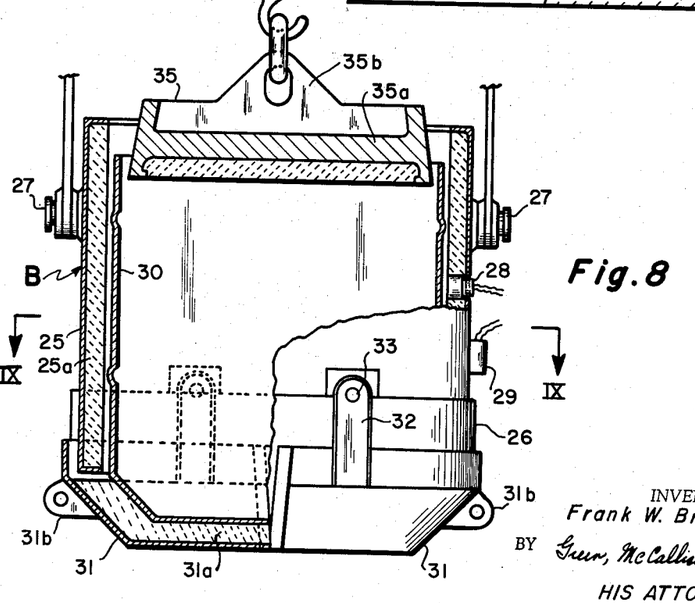
FIGURE 8 is an enlarged side view in elevation of the container assembly of FIGURES 1 and 2.
Figures 9, 10, 11:
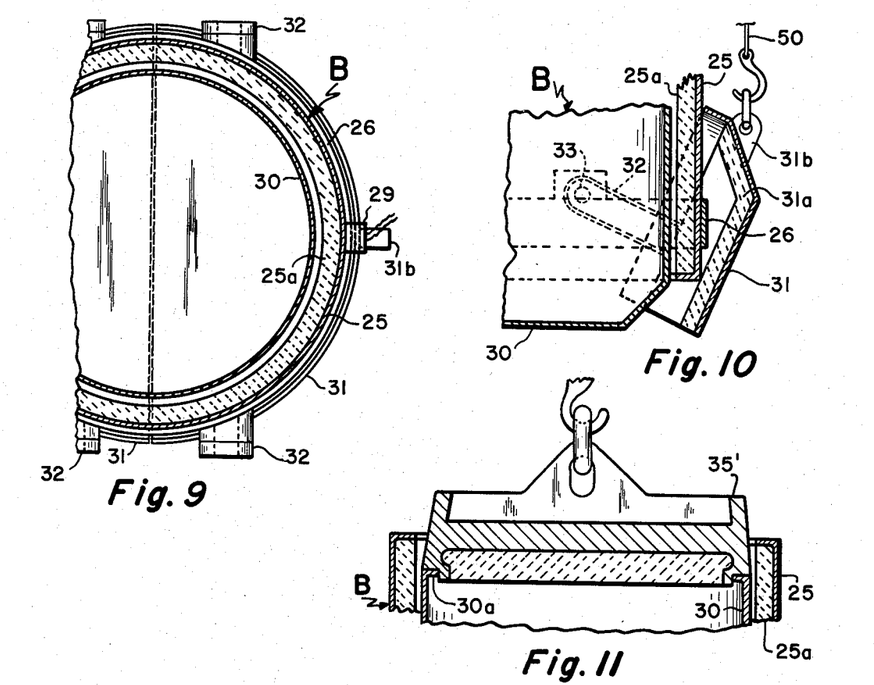
FIGURE 9 is a fragmental horizontal section on the scale of and taken along the line IX—IX of FIGURE 8.
FIGURE 10 is a side section in elevation illustrating details of the pivoted mounting of bottom closure leaves or gates of the outer container of FIGURES 8 and 9; in this view one representative leaf half for the bottom of the outer container is shown in a raised or open delivery position, such as also represented in FIGURE 5.
FIGURE 11 is a side section in elevation of the upper portion of the container assembly of FIGURE 8 on the same scale as such figure, showing the employment of an interfitting closure lid or hood for the inner container instead of the material-compacting, variable-position, lid of FIGURE 8.

As shown particularly in FIGURES 8, 9 and 10, the unit B includes an outer container body having a metal wall 25 and a refractory lining 25a and which has an upper open end portion to receive an inner, charging container 30 of a suitable material, such as metal which may become a part of a charge in a melting furnace. An opposed pair of trunnions 27, see particularly FIGURES 1, 2 and 8, project outwardly from opposite sides of the wall 25, so that the unit assembly B may be suspended by hoist or crane means or on a cantilever arm of a unit D of FIGURE 2. In addition, a thermostat 28 is shown in FIGURE 8 for determining the temperature of the charge being held and equalized, and a conventional commercial electric vibrator 29 is shown positioned on the wall 25 of the outer container body for effecting vibration-compaction of the metal charge within the inner container 30.

The inner container 30 has an open upper mouth or end portion and a closed bottom portion and is normally retained within the outer container body by a pair of swinging gates or leaves 31. As shown, these gates or leaves 31 are carried at the lower open end portion of the outer container body by a pair of swing arms 32 that are pivotally mounted at 33 on sides of the wall 25 and are preferably lined with refractory material 31a. The wall 25 has an annular reinforcing band 26 around its lower end portion for supporting the pivot means 33, as well as to serve as a limit stop for the closed positioning of the leaves or gates 31. Each leaf or gate 31 has an ear or hoist hook-receiving lug 31b, in order that it may be swung upwardly from its closed position of FIGURE 8 to its open position of FIGURE 10 to discharge the inner container 30 downwardly through the outer container body.

In FIGURE 8, I have shown a weighted lid 35 which has a loose interfitting relation with respect to the inner container 30 and is adapted to be raised and lowered therewithin to aid in compacting or unitizing a metal charge being carried therewithin. The weighted lid 35 has a depressed upper face portion 35a to receive and support any additional weights that may be desirable or necessary for aiding in the compacting operation and for aiding in the submerging of the charge within a molten metal bath or pool of a furnace. The lid 35 also has an upper, centrally-disposed lift lug 35b which may be engaged by a hoist cable hook for raising and lowering it and holding it in a desired position with respect to the inner container 30 and the metal charge therein.

In FIGURE 2, I have shown a traveling rig unit D as representative means for handling the container assembly or unit B. The hood 20 may be first removed (as by a swing column and arm shown in FIGURE 1 of my Patent No. 2,804,295) before the unit B is picked up by a cantilever arm 40 of the traveling rig D. This rig is positioned on a cart or wheeled truck E for movement along plant main trackway and for turning on a track turntable for movement along a branch trackway towards a particular charge-requiring melting furnace. As shown, the unit D has a horizontally-rotatable positioning on the truck E, as represented by cooperating bearing assemblies 37 that project downwardly from platform 38 and are carried by the upper platform of a cart or truck unit E. A pivot shaft 39 is secured to and projects upwardly from the cart E for retaining the unit D in position.

The unit D has a cantilever arm or member 40 which projects upwardly and forwardly thereof and which has a pair of downwardly offset groove portions 41 to removably-receive the trunnions 27 of the unit B. Framework structure 43 is secured to project upwardly from and in a spaced relation substantially horizontally along-above the cantilever member 40. Sheaves or pulleys 44, 45, 46 and 47 are operatively mounted on the frame 43 by mounts 48 to receive hoisting cables or chains. One pair of hoist chains or cables 50 carries hoist hooks to engage the lugs 31b of the gates 31 to lift them to the open position of FIGURE 10. In FIGURE 2, the gates 31 are shown swing-mounted or balanced to normally retain themselves in a closed position.

Figure 3:
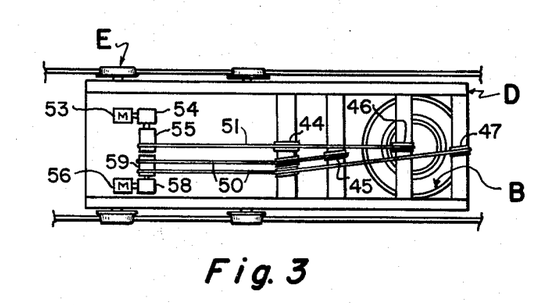

A third hoist chain or cable 51 carries a hook for engaging the weighted lid or cover 35. An electric motor 53 (see FIGURE 3) drives a gear-reducing unit 54 and drum 55 (having brake and release mechanism) for raising and lowering the hoist chain or cable 51; the drum release mechanism permits the weighted lid to be dropped. Similarly, a motor 56 having a speed-reducing gear unit 58 drives a drum 59 (also having a brake) for actuating the cables or chains 50. It is thus apparent that the unit D not only serves to support and carry the unit B from one location to another and to pick-up a charged unit B from a charge-receiving position, such as indicated in FIGURE 1, but to also move the unit B to and align it with a suitable melting furnace. A group of melting furnaces may be provided, if desired, and the unit D thus makes possible their selective charging.

Figure 4:
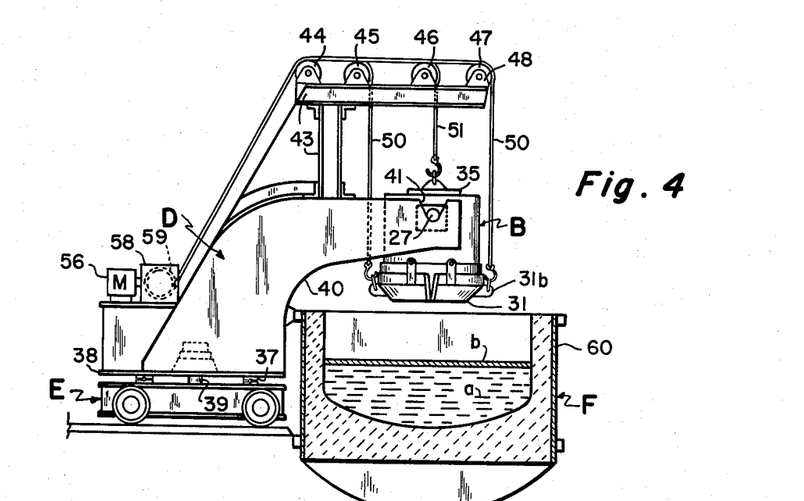
FIGURE 4 is a side view in elevation of the apparatus of FIGURES 2 and 3 and on the same scale as such figures, showing the container assembly in an overhead aligned position with the open mouth of a melting and refining furnace.
Figure 5:
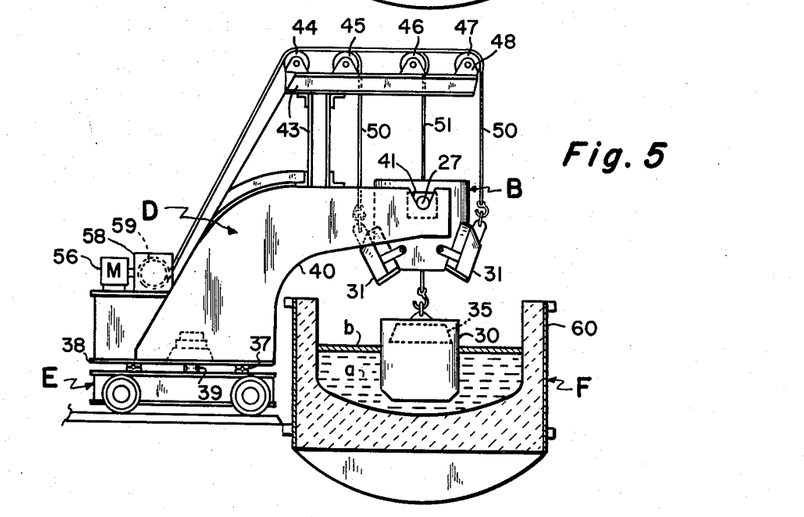
FIGURE 5 is a view similar to FIGURE 4 showing the device in the same position, but as operated to open an outer container and release and discharge an inner container of the assembly and discharge the metal material therein downwardly into the molten metal bath of the furnace as a charge; in this connection, the charge is shown carried in an inner enclosure or container and as thus introduced through a slag blanket into the molten metal of the furnace.

In FIGURES 4 and 5, I have illustrated the charging of a furnace, as effected by the rig unit D. In FIGURE 4, the unit D has moved the container unit B to an aligned overhead position with respect to a furnace F; in FIGURE 4, the cables 50 have been wound on the drum 59 actuating the motor 56 to swing the gates 31 upwardly and release the inner container 30. At the same time, the weighted lid 35 has been permitted to follow the inner container 30 into its charging position with respect to the furnace unit F by releasing the brake and actuating the release mechanism of the drum 55. Then, release mechanism of the drum 55 is reset and the motor 53 is actuated to raise the cable 51 and the lid 35 out of its "down" position (see FIGURE 6) for use in a second inner charging container 30.

The furnace F is shown as containing a molten metal pool or bath a, surmounted by a molten slag layer b. Metal material consisting of a compact charge unit is thus introduced in a segregated relation through the slag layer b, directly into the molten metal a, and beneath the slag layer in an immersion-displacing relationship with respect to the metal of the bath a. At this time, as illustrated somewhat diagrammatically in FIGURES 6 and 7, the bottom of the inner container 30 tends to first melt away to fully release the compact charge and start the melting and molecular diffusing of it. Also, the side walls of the inner container 30 melt away and may become a part of the charge. However, the compacted charge is melted and diffused within the molten metal of the pool before any portion of it becomes in contact with the slag blanket b. Gangue and other impurities of the charge move upwardly, due to their lower specific gravity, towards the surface of the metal pool to become a part of the slag blanket.

As indicated, in my type of melting operation, the metal charge in its compacted condition is directly introduced in a protected relation into the molten metal pool and is maintained below the slag blanket and surface interface of the molten metal pool, so that it is not exposed to atmospheric, slag or surface area action while it is being melted and diffused within or beneath the surface of the pool. This is illustrated particularly in FIGURES 7 and 13 of the drawings and as compared with the conventional melting operation of FIGURE 12 of the drawings. It will be apparent that the process is practically efficacious for directly charging relatively impure materials, such as reduced ore, as well as highly refractory or high melting point materials, such as titanium, zirconium, beryllium, etc., that may otherwise be uneconomic by reason of pick-up by the slag, etc.

In FIGURES 6 and 7, I have illustrated an electric furnace installation 60 which has two charging roof parts 61 and 61', that carry electrodes 62 and 62' and that, in effect, define two compartments for a common molten metal pool or bath. Thus, as illustrated in FIGURE 6, the metal pool of one half or part of the furnace may be subjected to full melting heat of its electrodes in one furnace compartment, while a charge is being introduced into the metal pool through the other half or part whose compartment is open. In this connection, the electrodes and their associated furnace roof part are lifted out of the way to leave the molten bath exposed in an immediate underlying compartment area of the furnace. In this way, the melting and refining temperature of the molten metal in the pool a may be efficiently retained, even during the charging operation, to increase the efficiency of the operation of the furnace, as well as to minimize the time period involved in melting, refining and building up molten metal from the charges introduced into the furnace. Excess slag may be removed in a conventional manner through a slag spout. The molten metal may also be poured or discharged from the furnace in any conventional manner.

Figure 13:
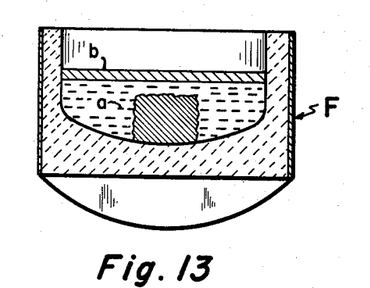

In FIGURES 12 and 13, I have somewhat diagrammatically illustrated principles of utilization of my charging procedure from the standpoint of a typical ferrous metal bath a and a surmounting molten slag blanket b, with representative temperatures involved. In FIGURE 11, I have illustrated a modified type of lid 35' which interfits with a flange 30a about the upper end of the inner container 30. This type of lid may be used where vibration effected by the unit 29 (see FIGURE 8) provides sufficient compaction of the charging material without also using the lid as a compacting or unitizing means.

Although I have set forth and illustrated utilizations of my invention, it will be apparent to those skilled in the art that the principles thereof may be embodied, utilized and adapted in various ways by those skilled in the art without departing from its spirit and scope.

What I claim is:

1. An improved procedure for charging metal melting furnace which comprises, forming a charge of the metal material into a compact unit, providing a molten metal pool within the furnace of a depth sufficient to fully submerge the compact unit charge, directly introducing the compact unit charge beneath the surface of the molten metal pool by displacement-immersing it therein, and fully melting and molecularly diffusing the compact unit charge within the molten metal pool while it is fully submerged therein.

2. An improved procedure as defined in claim 1 wherein the compact unit charge has an elevated temperature when it is introduced into the molted metal pool.

3. An improved procedure as defined in claim 1 wherein, a molten refining slag blanket is maintained on the surface of the molten metal pool in the furnace, and the compact unit charge is introduced without exposure to and beneath the slag blanket and the surface of the molten metal pool and its impurities are moved upwardly through the molten metal pool into the slag blanket during the melting of the compact unit charge therein.

4. An improved procedure as defined in claim 1 wherein, the charge is reduced under the application of heat prior to its introduction into the molten metal pool, and heat content of the charge from its reducing operation is retained when the compact unit charge is introduced into the molten metal pool.

5. An improved procedure for charging a metal melting furnace which comprises, reducing metal ore by the application of heat, feeding the hot reduced ore into a container of a metal that is to comprise a portion of the charge, compacting the reduced ore in the container, providing a molten metal pool in the furnace, immersion-introducing the container into and submerging the compacted ore depthwise in the molten metal pool of the furnace, melting away the container within the molten metal pool, and while maintaining the compacted ore below the surface of the molten metal pool, melting and diffusing the compacted ore within the molten pool while passing impurities contained therein upwardly through the molten metal pool towards its surface.

6. An improved procedure as defined in claim 5 wherein heat imparted to the metal ore by the reducing operation is retained by the charge when it is introduced into the molten metal pool.

7. An improved procedure for charging a metal melting furnace and refining the charge therein which comprises, substantially continuously reducing metal ore under the application of heat to provide charging material for the furnace, collecting progressive portions of the reduced ore as supplied in a heated condition from the reducing operation as successive charges within a series of charging containers of a material suitable for charging the melting furnace, closing-off the containers to retain the heat of the reduced ore charges therein and compacting the charges therein into unit charges, providing a molten metal pool having a molten refining slag blanket in at least one melting furnace, successively immersion-displacing and introducing successive unit charges through the slag blanket into the molten metal pool by dropping their containers therein, melting away each container from its bottom and melting down all portions of its unit charge as thus introduced within and beneath the surface of the molten metal pool, and diffusing the metal of unit charges thus introduced through the molten pool and moving impurities contained therein upwardly through the molten metal pool into the slag blanket.

8. An improved procedure as defined in claim 7 wherein heat imparted to the successive charges by the reducing operation is retained by the unit charges until they are introduced into the molten metal pool.

9. An improved procedure for charging a metal melting furnace and refining the charge therein which comprises, reducing metal ore under the application of heat, collecting individual charges of the hot reduced ore and compacting the charges thereof while retaining their heat, maintaining a molten metal pool in a furnace having at least a pair of charging compartments over the molten metal pool, immersion-displacing the molten metal of the pool and introducing the compacted charges having retained heat alternately through each charging compartment of the furnace into the molten metal pool while actively applying melting heat to molten metal beneath the other compartment, and while maintaining the compacted charges beneath the surface of the molten metal pool, fully melting and molecularly diffusing the compacted charges as thus introduced into the molten metal pool.

10. An improved procedure as defined in claim 9 wherein the reduced ore is first pelletized before being introduced into the molten metal pool of the furnace.

11. An improved procedure as defined in claim 9 wherein, the compacted charges introduced into the molten metal bath are fully submerged in the bath below the upper surface thereof, and the charges are introduced within containers which are melted within the bath to comprise a molten part thereof.

12. An improved procedure for melting and refining ferrous metal in a melting furnace which comprises, kiln-reducing ferrous metal ore under the application of heat, physically conditioning the reduced ore containing iron and gangue to form a series of compact unit charges while retaining heat of the reducing operation within the compact unit charges, providing a molten metal pool within a furnace and of a sufficient depth to fully submerge the compact unit charges, dropping the compact unit charges into the molten metal pool below the surface thereof while displacing the molten metal about the charges, maintaining the charges below the surface of the molten metal pool, and melting and fully diffusing the charges within the molten metal pool while moving the gangue and other impurities contained therein towards the surface of the pool.

13. In an improving procedure as defined in claim 12 wherein, the molten metal pool is maintained at a temperature of about 2950° F., the charges are introduced thereto at a temperature of about 1800° F., a molten slag blanket of a temperature of about 2600° F. is maintained on the surface of the molten metal pool, the charges are introduced in a segregated relation with respect to and through the slag blanket into the molten metal pool beneath the slag blanket, and the impurities moving from the charges are moved into the slag blanket.

14. A system for conditioning and melting a charge of metal material which comprises, a kiln for reducing the charge of metal material under the application of heat, a container unit for receiving the heated reduced charge of metal material and for substantially retaining it in its heated condition, a melting furnace having a molten metal pool therein of sufficient depth to fully immersion-receive the charge of the metal material, means for directly introducing the heated reduced charge of metal material while in said container unit beneath the surface of the molten metal pool without exposing the charge to the surrounding atmosphere and the molten metal of the pool, and said container unit having means to thereafter discharge the heated reduced charge of metal material to the molten metal pool for subjecting it to the melting and diffusing action thereof as thus introduced thereto.

15. A system for conditioning metal ore and melting it which comprises, a rotating kiln unit for reducing the metal ore under the application of heat and feeding hot reduced metal ore from one end thereof, a compacting unit for receiving the hot reduced metal ore including gangue from the kiln, a movable container unit having an inner container that is open at its upper end to receive hot compacted ore and gangue as a charge from the compacting unit, a remotely-located melting furnace having a molten metal pool therein, a traveling rig unit for picking up said container unit and supporting it in a raised position, said rig unit having a truck for moving it to a position in alignment with the furnace, a weighted lid carried by said rig unit for substantially closing-off the open upper end of the inner container of said container unit, and said rig having means for lowering the inner container and its charge downwardly into an immersion-melting position within molten metal bath of the furnace with the lid in place over the charge and for raising the lid away from the charge when it is introduced into the furnace.

16. A system for conditioning metal ore and for charging it into and melting it down in a melting furnace having a molten metal pool therein of sufficient depth to fully immersion-receive the metal ore as charged therein which comprises, a unit for reducing the metal ore under the application of heat and for feeding hot reduced metal ore including gangue therefrom, a container assembly for receiving the hot reduced metal ore including gangue from said reducing unit, said assembly having an inner container that is open at its upper end to receive the hot reduced ore and gangue as a charge, said assembly having an outer container and a weighted lid for maintaining the hot reduced charge at substantially its raised temperature within said inner container, means for moving said weighted lid to compact the hot charge into a hot charging unit within said inner container, means for moving said inner container from an ore-receiving position into charging-alignment with the melting furnace; and means for moving said inner container, the hot charging unit, and said weighted lid out of said outer container into a position in which the hot charging unit is fully immersed within and beneath the surface of the molten metal pool of the furnace; said weighted lid cooperating with said inner container for retaining the hot charging unit in an immersed position beneath the surface of the molten metal pool until all of its portions are melted by and diffused with the molten metal pool beneath its surface.

17. In combination with a melting furnace having a molten metal pool of sufficient depth to fully immersion-receive a charge of metal material and having a slag blanket on the surface of the molten metal pool for refining the metal material, a container for receiving a charge of the metal material, means for directly introducing the charge while in the container through the slag blanket into and beneath the surface of the molten metal pool, said container having means for protecting the unit charge from exposure to the slag blanket and from melting action of the molten metal pool until the unit charge is fully submerged beneath the surface of the molten metal pool, and said container having a lower end portion adapted to melt away within the molten metal pool when the unit charge is submerged therebeneath for discharging the unit charge to the molten metal pool and for subjecting the unit charge to the melting and diffusing action of the molten metal pool beneath the slag blanket.

18. In an apparatus for receiving a charge of metal material and holding it and introducing it into a molten bath of a furnace which comprises, an outer container body having an upper open end portion and pivoted gates for closing and opening its lower end portion, an inner charge-receiving container removably-carried within said outer container body, said inner container having an upper open end portion and a closed bottom end portion for receiving and carrying the charge of metal material therein, a weighted lid for substantially closing-off an upper open end portion of said inner container, means for dropping said inner container with the metal charge therein and with said lid in place with respect thereto through said outer container body when its pivoted gates are opened and into an immersed relationship within the molten metal bath of the furnace, and means for raising said weighted lid to a position above the furnace when said inner container and the charge therein has been introduced in a submerged relation within the molten metal bath of the furnace.

19. Apparatus as defined in claim 18 wherein means carries said weighted lid in a suspended relationship within the upper open end portion of said inner container and is constructed to drop said weighted lid down within said inner container to compact the metal charge therein.

20. Apparatus as defined in claim 18 wherein, means pivotally mounts said gates on the bottom portion of said outer container body, and means is associated with said gates for lifting them about said first-mentioned means to an open position for discharging said inner container downwardly through the bottom end portion of said outer container body.

21. Apparatus as defined in claim 20 wherein, said inner container body has a refractory lining for retaining heat of the metal charge within said inner container, and vibrating means is operatively positioned on said outer container body for vibrating said inner container and the metal charge therein to compact it within said inner container.

22. In combination in a charge-receiving, holding, transporting, conditioning, and discharging apparatus for a plant, a container assembly comprising an outer container body having an open upper end portion and a pair of outwardly-projecting trunnions, said contained assembly also comprising an inner container having an open upper end portion and a closed bottom portion to receive and carry a metal charge, a pair of bottom gates swingably mounted on said outer container body to retain said inner container in position therein and discharge it therefrom when said gates are swung to an open position, a weighted lid positioned for cooperative movement within the upper open end portion of said inner container to compact the metal charge therein, a traveling rig for movement along the plant, said traveling rig having a forwardly-projecting cantilever arm provided with portions for receiving said trunnions and removably carrying said container assembly, an overhead frame carried by said cantilever arm, a pair of hoist means operatively positioned on said overhead frame, one of said hoist means having means for engaging said weighted lid for raising and lowering it into and out of and within said inner container, and the other of said hoist means having means for engaging said swingably mounted gates to raise them into an open position for discharging said inner container downwardly through said outer container.

23. Apparatus for conditioning metal material and for melting it down in a melting furnace having a molten metal pool therein of sufficient depth to fully immersion-receive the metal material as charged therein which comprises, means for forming the metal material into a unit charge, enclosure means for directly introducing the unit charge as a weighted charge beneath the surface of the molten metal pool and for protecting it from melting action of the molten metal pool until it is in a position beneath the surface thereof, and said enclosure means being constructed to progressively melt away from a bottom thereof and progressively expose all portions of the unit charge to the melting and diffusing action of the molten metal pool beneath its surface.

24. Apparatus for conditioning metal material containing impurities and for charging it into and melting it down in a melting furnace having a molten metal pool therein of sufficient depth to fully immersion-receive the metal material as charged therein which comprises, means for reducing metal under the application of heat and for feeding hot reduced metal material therefrom, means for receiving the hot reduced metal from said reducing means, means within which said receiving means is placed for maintaining the temperature of the hot reduced metal material until it is charged into the furnace, wieghting means cooperating with said receiving means for compacting the hot reduced metal material into a compact unit and weighting it, means for charging the unit as positioned in said receiving means and with said weighting means positioned thereon directly into and beneath the surface of the molten metal pool, while protecting the unit from exposure to the atmosphere and from melting action of the surface of the molten metal pool; said receiving means being constructed to retain the unit beneath the surface of the molten metal pool and to cooperate with the molten metal pool in progressively melting away and diffusing all portions of the metal material of the unit from the bottom of the molten metal pool, and means for removing said weighting means from the unit before it is fully melting down within the molten metal pool.

25. A traveling rig for picking up, transporting and delivering a charge receiving and discharging container assembly having a pair of opposed side-projecting trunnions which comprises, a wheeled truck having a platform, an upper platform rotatably mounted on the platform of said truck, a cantilever structure secured to said upper platform to project upwardly and forwardly therefrom, said cantilever structure having notched arm portions at its forward projection to removably-receive the opposed trunnions of the container assembly, an overhead frame secured to project upwardly from said cantilever structure above said notched arm portions thereof, hoist means operatively-carried by said overhead frame for raising and lowering the container assembly into and out of a removably-received position with respect to said arm portions and for operating the container assembly, motor drive means operatively-connected along a back side of said cantilever structure for actuating said hoist means, and said motor drive means being mounted on said upper platform and being secured to said cantilever structure adjacent its lower end portion in an opposed backward relation with respect to said notched arm portions and said overhead frame.

References Cited in the file of this patent

UNITED STATES PATENTS

| | | |
|---|---|---|
| 126,923 | Blair | May 21, 1872 |
| 2,063,402 | Rossman | Dec. 8, 1936 |
| 2,804,295 | Brooke | Aug. 27, 1957 |
| 3,022,990 | McFeaters et al. | Feb. 27, 1962 |

UNITED STATES PATENT OFFICE
CERTIFICATE OF CORRECTION

Patent No. 3,147,107                      September 1, 1964

Frank W. Brooke

It is hereby certified that error appears in the above numbered patent requiring correction and that the said Letters Patent should read as corrected below.

Column 7, line 62, for "becomes" read -- comes --; column 12, line 59, for "melting" read -- melted --.

Signed and sealed this 16th day of February 1965.

(SEAL)
Attest:

ERNEST W. SWIDER                      EDWARD J. BRENNER
Attesting Officer                       Commissioner of Patents